United States Patent
Aramouni

(10) Patent No.: US 9,314,044 B2
(45) Date of Patent: Apr. 19, 2016

(54) METHOD FOR EXTRACTING PROTEIN FROM KANIWA AND PROTEIN PRODUCTS THEREOF

(71) Applicant: FitLife Brands, Inc., Omaha, NE (US)

(72) Inventor: Fadi Aramouni, Los Angeles, CA (US)

(73) Assignee: FitLife Brands, Inc., Omaha, NE (US)

( * ) Notice: Subject to any disclaimer, the term of this patent is extended or adjusted under 35 U.S.C. 154(b) by 147 days.

(21) Appl. No.: 14/192,677

(22) Filed: Feb. 27, 2014

(65) Prior Publication Data

US 2014/0314936 A1   Oct. 23, 2014

Related U.S. Application Data

(60) Provisional application No. 61/770,716, filed on Feb. 28, 2013.

(51) Int. Cl.
  *A23J 1/00* (2006.01)
  *A23J 3/14* (2006.01)
  *A23L 1/305* (2006.01)

(52) U.S. Cl.
  CPC .. *A23J 3/14* (2013.01); *A23J 1/006* (2013.01); *A23L 1/3055* (2013.01)

(58) Field of Classification Search
  CPC ........... A23J 3/14; A23J 1/006; A23L 1/3055
  USPC .......... 426/656, 507, 518, 450, 455, 456, 469
  See application file for complete search history.

(56) References Cited

U.S. PATENT DOCUMENTS 2,785,155 A * 3/1957 Anson et al. .................. 530/378
4,169,090 A * 9/1979 Murray et al. ................ 530/370
8,557,963 B2 * 10/2013 Wanasundara et al. ....... 530/377

FOREIGN PATENT DOCUMENTS

GB          195443    *   3/2003

OTHER PUBLICATIONS

Lindeboom, Nienke, Studies on the Characterization, Biosythesis and Isolation of Starch and Protein from Quinoa (Chenopodium Quinoa Willd.), Ph. D. Thesis, University of Saskatchewan, 2005.
Berghofer, E., at al., South American traditional pseudocereals, Thomas Gillgren Eds., S. 28-31, Sep. 2008.
Repo-Carrasco, R., et al., Nutritional Value and Use of the Andean Crops, Food Reviews International, 19 (1 & 2): 179-198, 2003.

* cited by examiner

*Primary Examiner* — Helen F Heggestad
(74) *Attorney, Agent, or Firm* — Patrick C. Woolley; Polsinelli PC

(57) ABSTRACT

Provided herein is a method for making a protein product from kaniwa. The method comprises milling the kaniwa. The milled kaniwa is contacted with a salt solution. A protein is precipitated from the kaniwa. The precipitated protein is dried to form a protein product. Also provided herein is a protein product produced by a method disclosed herein.

32 Claims, No Drawings

METHOD FOR EXTRACTING PROTEIN FROM KANIWA AND PROTEIN PRODUCTS THEREOF

CROSS-REFERENCE

The present disclosure claims priority to U.S. Provisional Application Ser. No. 61/770,716 filed Feb. 28, 2013, and entitled "Method for Extracting Protein from Kaniwa and Protein Products Thereof," which is incorporated herein by reference in its entirety.

TECHNICAL FIELD

The present disclosure relates to protein extraction from a seed or grain, in particular to protein extraction and a protein product from kaniwa.

BACKGROUND

Bitter taste and low protein levels mark current protein products derived from quinoa and other pseudocereals. Low water solubility leads to larger particulates that do not dissolve. The low yield of protein extract per ounce of raw material results in a higher price per pound of protein product. Current extraction methods also degrade the quality of the protein, permit unwanted autooxidation, and provide an incomplete balance of essential and non-essential amino acids. What is needed, therefore, is a protein extraction method that provides the desired protein levels, amino acid balance, extraction efficiency, and solubility, without bitterness.

SUMMARY

The present disclosure relates methods for isolating protein from kaniwa. Particularly, kaniwa does not contain the bitter-tasting compounds found in quinoa, so starting with kaniwa reduces the possibility of extracting a bitter-tasting protein product. Furthermore, treating the milled kaniwa with a salt solution allows for the protein to be precipitated from the protein extract to provide a protein product in better yield with an improved taste and more ready availability in food or commercial applications. This method also provides higher protein levels, better quality protein levels with an ideal amino acid balance, and greater water solubility.

In some embodiments, a method for making a protein product from kaniwa. The method comprises (a) milling the kaniwa. (b) The milled kaniwa is contacted with a salt solution. (c) A protein is precipitated from the kaniwa of step (b). And the precipitated protein is dried to form a protein product. The protein product may be substantially free of bitter-tasting compounds, such as saponins. The milling step may comprise dry milling or wet milling.

The salt may be selected from the Hofmeister series (lyotropic series) based on the ability of its constituent ions to salt out proteins. In exemplary embodiments, the salt may be selected from the group consisting of ammonium chloride, potassium chloride, sodium chloride, calcium chloride, and sodium citrate. In exemplary embodiments, the salt may be sodium citrate. In particular, the sodium citrate solution of about 0.5 wt. % to about 5 wt. % in water and is used in an about 1:5 to about 1:15 w/v ratio with the milled kaniwa. To effect precipitation of the protein, the pH of the salt solution may be adjusted to a pH of about 3 to about 4.5.

The contacting step may occur for about 2 to about 6 hours. The drying step may occur at about 50° C. to about 60° C. for about 14 to about 18 hours. In exemplary embodiments, the moisture content of the dried protein product may be less that 5 wt. %. In some embodiments, the method may further comprise centrifugation. In particular embodiments, the protein product may contain a complete set of essential amino acids.

In further embodiments, this disclosure provides a protein product produced according to the method disclosed herein. A number of consumer products may contain the protein product, for example a protein powder, protein drink, protein pill, protein bar, meal replacement, pediatric product, or sports nutrition product.

In other embodiments, this disclosure provides a method for making a protein product from kaniwa. The method comprises (a) contacting kaniwa for 2 to 6 hours with a salt solution of 0.5 wt. % to 5 wt. % in water and in a 1:5 to 1:15 w/v ratio with the kaniwa. (b) The pH of the salt solution is adjusted to a pH of 3 to 4.5 to effect precipitation of the protein from the kaniwa of step (a).

In some other embodiments, this disclosure provides a method for making a protein product from kaniwa. The method comprises (a) dry milling the kaniwa. (b) The milled kaniwa is contacted for 2 to 6 hours with a sodium citrate solution of 0.5 wt. % to 5 wt. % in water and in a 1:5 to 1:15 w/v ratio with the milled kaniwa. (c) The pH of the salt solution is adjusted to a pH of 3 to 4.5 to effect precipitation of the protein from the kaniwa of step (b). (d) The mixture of milled kaniwa and the salt solution of step (c) is centrifuged to separate the precipitated protein from the salt solution. (e) The precipitated protein is dried at 50° C. to 60° C. for 14 to 18 hours to form a protein product. Using this method, the protein product is substantially free of bitter-tasting compounds, has a complete set of essential amino acids, and has a moisture content less that 5 wt. %.

Unless otherwise defined, all technical and scientific terms used herein have the same meaning as is commonly understood by one of skill in the art to which this disclosure belongs at the time of filing. If specifically defined, then the definition provided herein takes precedent over any dictionary or extrinsic definition. Further, unless otherwise required by context, singular terms shall include pluralities, and plural terms shall include the singular. Herein, the use of "or" means "and/or" unless stated otherwise. All patents and publications referred to herein are incorporated by reference.

DETAILED DESCRIPTION

The present disclosure provides a method for disrupting the matrix of kaniwa, thereby producing a higher protein yield from kaniwa than from other seeds or grains. To extract, the kaniwa may be dry milled or wet milled. Optionally, sulfur dioxide may be used during wet milling. After milling, the kaniwa may be treated with a lye or a salt solution. Next, the kaniwa protein may be solvent oil extracted. In other embodiments, protein may be precipitated from the extract by adjusting the pH to a pH of about 3 to about 4.5. Methods to concentrate the precipitated proteins, include, but are not limited to drying methods (e.g. spray drying, air drying, drum drying) and centrifugation followed by drying. Protein concentrate and isolate produced according to this disclosure were analyzed for amino acid composition and functional properties, especially for solubility, water-holding capacity, foaming ability, and taste. A relatively large quantity of kaniwa may be used in the process.

"Protein product" refers to a protein concentrate or a protein isolate. A protein concentrate is a mixture of protein derived from a feedstock, such as kaniwa, and having a higher concentration per unit volume than the feedstock. A protein concentrate may contain other materials, such as carbohydrates, fats, nucleic acids, vitamins, minerals, and water. A protein isolate consists essentially of protein derived from a feedstock. While a protein isolate may contain trace amounts of other nutrients and solvent, it is essentially protein.

"Amino acid" refers to an organic compound having an amino group and a carboxylic acid attached to the same carbon atom. The carbon atom is optionally substituted with an organic substituent, also referred to as a side-chain. When joined together through amide (peptide) bonds, these amino acids form proteins. Twenty-three amino acids are proteinogenic, acting as basic building blocks for the proteins. Twenty-one of these amino acids are "standard" in humans, encoded directly by triplet codons in the genetic code. Nine of the standard amino acids are "essential amino acids" in humans, meaning that they cannot be created from other compounds in the human body. The essential amino acids are histidine, isoleucine, leucine, lysine, methionine, phenylalanine, threonine, tryptophan, and valine. The remaining eleven standard amino acids are "non-essential amino acids," meaning that they can typically be synthesized from other compounds in the human body. The non-essential amino acids are alanine, arginine, asparagine, aspartic acid, cysteine, glutamic acid, glutamine, glycine, ornithine, proline, serine, and tyrosine. In an exemplary embodiment, the protein product contains a complete set of essential amino acids. In other words, the protein product contains some of each of the nine essential amino acids.

"Grain" refers to any cultivated cereal crop used as food. As used herein, "grain" also encompasses seeds or kernels that may be used or cooked like a grain—so-called "psuedocereals." "Cereal" refers to a grass (members of the moncot family Poaceae, also known as Gramineae) cultivated for the edible components of their grain composed of the endosperm, germ, and bran. Botanically, these edible components are called a caryopsis. In their natural form as a whole grain, they are a rich source of vitamins, minerals, carbohydrates, fats, oils, and protein. Examples of cereals include, but are not limited to, rice, wheat, millet, maize, barley, sorghum, oats, triticale, rye, fonio, spelt, einkorn, emmer, durum, and kamut. Examples of pseudocereals include quinoa, buckwheat, teff, amaranth, chia, and kaniwa. The methods described herein may be applied to any pseudocereal, particularly to kaniwa.

"Kaniwa" or "kalliwa," is typically cultivated in the Andes Mountains, and is similar to quinoa with a nutty flavor. But kaniwa is without any bitterness. Though tinier and less fluffy than quinoa, kaniwa has a pleasant crunch and makes a satisfying alternative grain. Kaniwa also has higher protein content than quinoa, and contains fiber, iron, calcium, and zinc.

Quinoa contains bitter-tasting compounds, such as saponins, that are substantially absent from kaniwa. Saponins are often extracted along with proteins during processing. Starting from kaniwa instead of quinoa provides the advantage of no or substantially few bitter-tasting compounds, thus no or substantially little bitterness. Kaniwa also has the advantage of a higher protein content over quinoa, which permits more efficient extraction from feedstock.

"Saponin" refers an amphipathic glycoside, which causes soap-like foaming when shaken in aqueous solutions. Structurally, saponins contain a hydrophilic glycoside moiety and a lipophilic triterpene derivative. Typically, saponins are derived from plant material, such as grains, for example quinoa and amaranth. Saponins are not present in kaniwa.

The protein may be precipitated from a solution. The ionic strength of the solution may be controlled, enabling salting out. The pH of the solution may be controlled, permitting isoelectric precipitation. The dielectric constant of the solution may be controlled, permitting solvent fractionation. The temperature of the solution may be controlled, determining the amount of protein denaturation. The success of a protein precipitation is defined by Leco Nitrogen analysis.

In some embodiments, the milled kaniwa may be contacted with lye. "Lye" refers to any strong alkali, which is highly soluble in water and may produce caustic basic solution. In some embodiments, lye may refer to sodium hydroxide, potassium hydroxide, and mixtures thereof. In other embodiments, the milled kaniwa may be contacted with a salt solution. In particular embodiments, the salt may be selected from the group consisting of ammonium chloride, potassium chloride, sodium chloride, calcium chloride, and sodium citrate. In exemplary embodiments, the salt may be sodium citrate. The salt solution may have a concentration ranging from about 0.5 wt. % to about 5 wt. % in water, such as from about 0.5 wt. % to about 1 wt. %, from about 1 wt. % to about 1.5 wt. % in water, from about 1.5 wt. % to about 2 wt. % in water, from about 2 wt. % to about 2.5 wt. % in water, from about 2.5 wt. % to about 3 wt. % in water, from about 3 wt. % to about 3.5 wt. % in water, from about 3.5 wt. % to about 4 wt. % in water, from about 4 wt. % to about 4.5 wt. % in water, from about 4.5 wt. % to about 5 wt. % in water. In exemplary embodiments, the salt solution may have a contraction of 1 wt. % or 3 wt. % in water.

The ratio of salt solution to milled kaniwa can and will vary. In some embodiments, the salt solution may be used in an about 1:5 to about 1:15 w/v ratio with the milled kaniwa, for example in an about 1:5 to about 1:6 w/v ratio, in an about 1:6 to about 1:7 w/v ratio, in an about 1:7 to about 1:8 w/v ratio, in an about 1:8 to about 1:9 w/v ratio, in an about 1:9 to about 1:10 w/v ratio, in an about 1:10 to about 1:11 w/v ratio, in an about 1:11 to about 1:12 w/v ratio, in an about 1:12 to about 1:13 w/v ratio, in an about 1:13 to about 1:14 w/v ratio, or in an about 1:14 to about 1:15 w/v ratio. In exemplary embodiments, the salt solution may be used in an about 1:10 w/v ratio with the milled kaniwa.

The contacting step between the milled kaniwa and the salt solution may occur for about 2 hours to about 6 hours, such as about 2 hours, about 3 hours, about 4 hours, about 5 hours, or about 6 hours. The contact step may comprise skaking, stifling, or agitating the mixture of milled kaniwa and salt solution.

To effect precipitation of the protein, the pH of the salt solution may be adjusted to a pH of 3 to 4.5, for example to a pH of about 3, a pH of about 3.5, a pH of about 4, or a pH of about 4.5. In exemplary embodiments, the salt is sodium citrate with a concentration of about 1 wt. % and a pH of about 4. In other exemplary embodiments, the salt is sodium citrate with a concentration of about 3 wt. % and a pH of about 3.5. The pH may be adjusted using a food quality proton donor or acceptor, such as hydrochloric acid or sodium hydroxide, using any method known in the art.

In other embodiments, the protein product may be extracted from solution using a suitable organic solvent. Non-limiting examples of suitable aprotic solvents include acetone, acetonitrile, diethoxymethane, N,N-dimethylformamide (DMF), dimethyl sulfoxide (DMSO), N,N-dimethylpropionamide, 1,3-dimethyl-3,4,5,6-tetrahydro-2 (1H)-pyrimidinone (DMPU), 1,3-dimethyl-2-imidazolidinone (DMI), 1,2-dimethoxyethane (DME), dimethoxymethane, bis(2-methoxyethyl)ether, N,N-dimethylacetamide (DMAC), 1,4-dioxane, N-methyl-2-pyrrolidinone (NMP), ethyl acetate, ethyl formate, ethyl methyl ketone, formamide, hexachloroacetone, hexamethylphosphoramide, methyl acetate, N-methylacetamide, N-methylformamide, methylene chloride, nitrobenzene, nitromethane, propionitrile, sulfolane, tetramethylurea, tetrahydrofuran (THF), 2-methyl tetrahydrofuran, trichloromethane, and combinations thereof. Suitable examples of protic solvents include, but are not limited to, methanol, ethanol, isopropanol, n-propanol, isobutanol, n-butanol, s-butanol, t-butanol, formic acid, acetic acid, water, and combinations thereof. Suitable organic solvents include, but are not limited to, alkane and substituted alkane solvents (including cycloalkanes), aromatic hydrocarbons, esters, ethers, ketones, combinations thereof, and the like. Specific organic solvents that may be employed, include, for example, acetonitrile, benzene, butyl acetate, t-butyl methylether, t-butyl methylketone, chlorobenzene, chloroform, chloromethane, cyclohexane, dichloromethane, dichloroethane, diethyl ether, ethyl acetate, diethylene glycol, fluorobenzene, heptane, hexane, isobutylmethylketone, isopropyl acetate, methylethylketone, methyltetrahydrofuran, pentyl acetate, n-propyl acetate, tetrahydrofuran, toluene, and combinations thereof. In exemplary embodiments, the solvent used for protein extraction may be diethyl ether or ethanol.

In some embodiments, the method may further comprise centrifugation to separate the precipitated protein from the supernatant. Generally, when used, centrifugation would occur before the drying step. The centrifugation speed may range from about 7,000 rpm to about 28,000 rpm, such as from about 7,000 rpm to about 14,000 rpm, from about 14,000 rpm to about 21,000 rpm, or from about 21,000 rpm to about 28,000 rpm. The centrifugation time may range from about 5 minutes to about 5 hours, such as from about 5 minutes to about 15 minutes, from about 15 minutes to about 30 minutes, from about 30 minutes to about 1 hour, from about 1 hour to about 2 hours, from about 2 hours to about 3 hours, from about 3 hours to about 4 hours, or from about 4 hours to about 5 hours. The centrifugation temperature may range from about 0° C. to about 15° C., such as from about 0° C. to about 5° C., from about 2° C. to about 5° C., from about 5° C. to about 10° C., or from about 10° C. to about 15° C. In exemplary embodiments, the centrifugation may occur at about 14.000 rpm for about 30 min at about 4° C.

The drying step may use any method known in the art. The drying temperature may range from about 25° C. to about 100° C., such as from about 25° C. to about 30° C., such as from about 30° C. to about 35° C., from about 35° C. to about 40° C., from about 40° C. to about 45° C., from about 45° C. to about 50° C., from about 50° C. to about 55° C., from about 55° C. to about 60° C., from about 60° C. to about 65° C., from about 65° C. to about 70° C., from about 70° C. to about 75° C., from about 75° C. to about 80° C., from about 80° C. to about 85° C., from about 85° C. to about 90° C., from about 90° C. to about 95° C., or from about 95° C. to about 100° C. In exemplary embodiments, the drying temperature may be from about 50° C. to about 60° C., such as about 55° C.

The drying step may occur for about 12 hours to about 24 hours, such as for about 12 hours to about 14 hours, for about 14 hours to about 16 hours, for about 16 hours to about 18 hours, for about 18 hours to about 20 hours, for about 20 hours to about 22 hours, or for about 22 hours to about 24 hours. In exemplary embodiments, the drying step may occur for about 14 to about 18 hours, such as about 16 hours. In exemplary embodiments, the moisture content of the dried protein product may be less that about 10 wt. %, such as less than about 5 wt. %, less than about 4 wt. %, less than about 3 wt. %, less than about 2 wt. %, less than about 1 wt. %, less than about 0.5 wt. %, less than about 0.1 wt. %, or effectively 0 wt. % (that is, trace amounts of water or below the limit of detection).

A protein product as described herein may be used in any common protein supplement. Protein supplements come in various forms, including, for example, protein powders, protein drinks, protein pills, protein bars, meal replacements, pediatric products, and sports nutrition products. For example, a kaniwa protein product providing a complete set of amino acids may be substituted for soy protein as the ingredient in any protein supplement. In some embodiments, the protein supplement (e.g., a powder, pill, bar, and the like, as described herein) may comprise about 5-40 grams of kaniwa protein product per serving (e.g., equal to, greater than, at least, or any number in between 5, 10, 15, 20, 25, 30, 35, 40, 45, or 50 grams of protein/serving) wherein a serving of the composition may be less than, greater than, at least, or any number in between 10, 10.5, 11, 11.5, 12, 12.5, 13, 13.5, 14, 14.5, 15, 15.5, 16, 16.5, 17, 17.5, 18, 18.5, 19, 19.5, 20, 30, 40, 50, 60, 70, 80, 90 or 100 grams.

The kaniwa protein product may be used in a protein powder. The protein powder may further comprise one or more excipients, such as fillers, soublizers, flavorants, sweeteners, dietary minerals, binders, vitamins, fatty acids (e.g., omega-3 or omega-6 fatty acids), caffeine, and the like. The protein powders may be formulated to provide a protein drink upon the addition of water and adequate mixing, such as vigorous shaking.

In other embodiments, the protein product may be formulated as a protein drink in stable liquid form. The protein drink may comprise more than about 10 grams of kaniwa protein per 100 mL. The protein drink may have a pH of from about 5.0 to about 8.0, such as about 7.0, or about 6.8. The protein drink may further comprise one or more excipients, such as water, fillers, soublizers, flavorants, sweeteners, dietary minerals, binders, vitamins, fatty acids (e.g., omega-3 or omega-6 fatty acids), caffeine and the like.

In other embodiments, the protein product may be formulated as a protein bar, chew, snack, or other food item. The protein bar may further comprise one or more excipients, such as fillers, soublizers, flavorants, sweeteners, dietary minerals, binders, vitamins, fatty acids (e.g., omega-3 or omega-6 fatty acids), caffeine, and the like. The protein bar may also comprise nuts, dried fruit, pretzels, soybeans, chocolate, coffee, coconut, and other ingredients commonly found in protein bars.

In particular embodiments, the protein powder, protein drink, protein bar may be formulated for pediatric use, such that it may be used a breastmilk substitute, infant formula, infant formula component, or pediatric food fortifier. In still other embodiments, the protein powder, protein drink, or protein bar may be formulated as a sports nutrition product which provides to the person the amount of protein used for a certain activity level. For example, recreational athletes use about 0.5 to about 0.75 grams of protein daily for every per pound of bodyweight, competitive athletes use about 0.6 to about 0.9 grams per pound of bodyweight, teenage athletes use about 0.8 to about 0.9 grams per pound of bodyweight, and athletes building muscle mass use about 0.7 to about 0.9 grams per pound of bodyweight. In some embodiments, the protein powder, protein drink, or protein bar may be used as a meal replacement.

In still other embodiments, the protein product may be formulated as a protein pill. The protein pill may further one or more excipients, such as comprise fillers, soublizers, flavorants, sweeteners, dietary minerals, binders, vitamins, fatty acids (e.g., omega-3 or omega-6 fatty acids), caffeine, and the like.

In one embodiment, the excipient may be a binder, which holds the protein supplement together until administration. Suitable binders include starches, pregelatinized starches, gelatin, polyvinylpyrrolidone, cellulose, methylcellulose, sodium carboxymethylcellulose, ethylcellulose, polyacrylamides, polyvinyloxoazolidone, polyvinyl alcohols, $C_{12}$-$C_{18}$ fatty acid alcohol, polyethylene glycol, polyols, saccharides, oligosaccharides, polypeptides, peptides, and combinations thereof.

The excipient may include a flavorant that may act as a flavoring agent and/or as a flavor-masking agent. In some embodiments, the flavorant may comprise one or more of a sweetening agent, a savory agent (i.e., an agent that imbues the protein supplement with a salty flavor), a bittering agent, and a souring agent. Flavorants may be chosen from synthetic flavor oils and flavoring aromatics and/or natural oils, extracts from plants, leaves, flowers, fruits, and combinations thereof. By way of example, these may include cinnamon oils, oil of wintergreen, peppermint oils, clover oil, hay oil, anise oil, eucalyptus, vanilla, citrus oils (such as lemon oil, orange oil, grape and grapefruit oil), and fruit essences (such as apple, peach, pear, strawberry, raspberry, cherry, plum, pineapple, and apricot). In some embodiments, the flavoring agents and/or flavor-masking agents may comprise a vanilla-comprising composition, for example ethylvanillin, vanillin-RHD, vanillin-Merck, vanilla-TG-old; chocolate, coffee, and suitable solvents (e.g., ethanol and/or water).

In another embodiment, the excipient may include a sweetener. By way of non-limiting example, the sweetener may be selected from glucose (corn syrup), dextrose, invert sugar, fructose, and mixtures thereof (when not used as a carrier); saccharin and its various salts such as the sodium salt; dipeptide sweeteners such as aspartame; dihydrochalcone compounds, glycyrrhizin; stevia-derived sweeteners; chloro derivatives of sucrose such as sucralose; sugar alcohols such as sorbitol, mannitol, xylitol, and the like. Also contemplated are hydrogenated starch hydrolysates and the synthetic sweetener 3,6-dihydro-6-methyl-1,2,3-oxathiazin-4-one-2,2-dioxide, particularly the potassium salt (acesulfame-K), and sodium and calcium salts thereof. In particular embodiments, the protein supplement may be formulated for oral administration and include one or more of the following flavorant (e.g., sweetening agents): sucralose, MagnaSweet®, Di-Pac® compressible sugar (i.e., a 97:3 mixture of sucrose and maltodextrin), Thaumatin T200X, Talin-Pure, OptisweetSD, stevia extract rebaudioside A, and/or neotame.

The excipient may include a taste-masking agent. Taste-masking materials include cellulose hydroxypropyl ethers (HPC); low-substituted cellulose hydroxypropyl ethers (L-HPC); cellulose hydroxypropyl methyl ethers (HPMC); methylcellulose polymers and mixtures thereof; polyvinyl alcohol (PVA); hydroxyethylcelluloses; carboxymethylcelluloses and salts thereof; polyvinyl alcohol and polyethylene glycol co-polymers; monoglycerides or triglycerides; polyethylene glycols; acrylic polymers; mixtures of acrylic polymers with cellulose ethers; cellulose acetate phthalate; and combinations thereof.

In some embodiments, the flavorant may comprise a percent weight per final volume of the protein supplement form about 50% to about 0.001%, depending on the agent selected, such as from about 40% to about 0.01%, from about 30% to about 0.01%, from about 1% to about 30%, or from about 5% to about 15%. As previously mentioned, the protein supplement may include more than one flavorant.

In another embodiment, the excipient may be a filler, which adds bulk to the protein supplement for easier handling and more accurate dosing. Suitable fillers include carbohydrates, inorganic compounds, and polyvinylpyrrolidone. By way of non-limiting example, the filler may be calcium sulfate, both di- and tri-basic, starch, calcium carbonate, magnesium carbonate, microcrystalline cellulose, dibasic calcium phosphate, magnesium carbonate, magnesium oxide, calcium silicate, talc, modified starches, lactose, sucrose, mannitol, and sorbitol.

The excipient may be a non-effervescent disintegrant, which allows the protein supplement to more easily dissolve after administration without evolving gas. Suitable examples of non-effervescent disintegrants include starches (such as corn starch, potato starch, and the like), pregelatinized and modified starches thereof, sweeteners, clays (such as bentonite), microcrystalline cellulose, alginates, sodium starch glycolate, and gums (such as agar, guar, locust bean, karaya, pecitin, and tragacanth).

The excipient may comprise a preservative, which increases the stability and storage lifetime of the protein supplement, particularly delaying unwanted degradation of the active ingredients. Suitable examples of preservatives include antioxidants (such as alpha-tocopherol or ascorbate) and antimicrobials (such as parabens, chlorobutanol or phenol). In other embodiments, an antioxidant such as butylated hydroxytoluene (BHT) or butylated hydroxyanisole (BHA) may be used.

The excipient may include a diluent, which diminishes the relative concentrations of other components within the protein supplement. Diluents suitable for use include food-grade saccharides such as sucrose, dextrose, lactose, microcrystalline cellulose, fructose, xylitol, and sorbitol; polyhydric alcohols; starches; pre-manufactured direct compression diluents; and mixtures of any of the foregoing.

The excipient may comprise a surfactant, which alters the solubility parameters of the other components within the protein supplement. In various embodiments, the surfactant may be a alkylaryl polyether alcohol, such as Triton™ X-100, Surfonic™ N-100 (nonoxaynol-10), or Witconol™ NP-100; or a poloxamer, such as Pluronic™, Synperonic™, or Kolliphor™. Other suitable examples of surfactants include, for example, 2-acrylamido-2-methylpropane sulfonic acid, alkyl polyglycoside, ammonium perfluorononanoate, benzalkonium chloride (BAC), benzethonium chloride (BZT), 5-bromo-5-nitro-1,3-dioxane, cetyl trimethylammonium bromide (CTAB, hexadecyltrimehtylammonium bromide, cetyl trimethylammonium chloride), cetylpridinium chloride (CPC), cyclohexyl-1-hexyl-maltopyranoside, decylmaltopyranoside, decyl polyglucose, dimethyldioctadecylammonium chloride, dioctadecyldimethylammmonium bromide (DODAB), dipalmitoylphosphatidylcholine, lauryldimethylamine oxide, dodecylmaltopyranoside, magnesium laureth sulfate polyethoxylated tallow amine (POEA), octenidine dihydrochloride, octylphenoxypolyethoxyethanol (Igepal™ CA-630), octylthioglucopyranoside (OTG), ox gall, sodium nonanoyloxybenzensulfonate, sorbitan monolaurate, surfactin, and thonozonium bromide. In exemplary embodiments, the surfactant may be a poloxamer or sodium lauryl sulfate.

The excipient may be a lubricant, which allows easier removal of the protein supplement from molds during manufacture and may aid administration of the protein supplement. Suitable non-limiting examples of lubricants include magnesium stearate, calcium stearate, zinc stearate, hydrogenated vegetable oils, sterotex, polyoxyethylene monostearate, talc, polyethyleneglycol, sodium benzoate, sodium lauryl sulfate, magnesium lauryl sulfate, and light mineral oil.

The excipient may be a dispersion enhancer, which aids dispersion of the components of the protein supplement within the subject after administration. Suitable dispersants may include starch, alginic acid, polyvinylpyrrolidones, guar gum, kaolin, bentonite, purified wood cellulose, sodium starch glycolate, isoamorphous silicate, and microcrystalline cellulose.

Depending upon the embodiment, it may be desirable to provide a coloring agent, which aids cosmetic appeal, visualization, and identification of the protein supplement. Suitable color additives include food, drug and cosmetic colors (FD&C), drug and cosmetic colors (D&C), or external drug and cosmetic colors (Ext. D&C). These colors or dyes, along with their corresponding lakes, and certain natural and derived colorants may be suitable for use in the present invention depending on the embodiment.

In various embodiments, the excipient may include a pH modifier, which may alter the solubility profile and bioavailability parameters of components within the protein supplement. In certain embodiments, the pH modifier may include sodium carbonate or sodium bicarbonate.

The weight fraction of the excipient or combination of excipients in the protein supplement may be about 98% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the protein supplement.

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

As used herein, the term "w/w" designates the phrase "by weight" and is used to describe the concentration of a particular substance in a mixture or solution.

Although the disclosure described herein is susceptible to various modifications and alternative iterations, specific embodiments thereof have been described in greater detail above. It should be understood, however, that the detailed description is not intended to limit the disclosure to the specific embodiments disclosed. Rather, it should be understood that the disclosure is intended to cover all modifications, equivalents, and alternatives falling within the spirit and scope of the disclosure as defined by the claim language.

EXAMPLES

The following examples are included to demonstrate certain embodiments of the disclosure. It should be appreciated by those of skill in the art that the techniques disclosed in the examples represent techniques discovered by the inventors to function well in the practice of the disclosure. Those of skill in the art should, however, in light of the present disclosure, appreciate that many changes can be made in the specific embodiments that are disclosed and still obtain a like or similar result without departing from the spirit and scope of the disclosure, therefore all matter set forth is to be interpreted as illustrative and not in a limiting sense.

Example 1

Extracting Protein from Kaniwa

Kaniwa was milled in a variety of mills available for small scale processes: hammer min, coffee grinder, and kitchen counter top grain mill. The ionic strength, the pH of the solution, dielectric constant, and temperature of the solution were controlled to affect the protein precipitation. In particular, the milled kaniwa was treated with a 1% or a 3% aqueous sodium citrate solution at a 1:10 w/v ratio. Next, the mixture was shaken on a laboratory shaker for 2 to 6 hours, After shaking, the citrate solution with the extract was adjusted to a pH of 3.5 to 4 to precipitate the protein. In particular, a 1% aqueous sodium citrate solution was used with a pH of 4.0 to effect precipitation of the protein product from the citrate extract, or a 3% aqueous sodium citrate solution was used with a pH 3.5 to effect precipitation. The protein precipitation was measured by Leco Nitrogen analysis.

In either case, after adequate time had passed, the citrate extract was centrifuged at 14,000 rpm for 30 min at 4° C. to obtain a pellet of the precipitated protein. The precipitated protein was dried in a forced air cabinet at 55° C. for 16 hours, thereby providing a final moisture content of less than 5 wt. %. The dried protein product was analyzed for amino acid composition and functional properties, especially for solubility, water-holding capacity, foaming ability, and taste. The protein product was low in bitterness as demonstrated by taste testing. The protein product also had a complete set of essential amino acids, and had good water solubility.

Example 2

Pretreatment with of Kaniwa with Lye

Pellets of kaniwa were soaked in a 0.1 N sodium hydroxide solution for various periods of time. The product was rinsed several times with potable water, dried, milled and the protein extracted as described above in Example 1. This procedure provided a pH adjustment to the protein product extracted from the kaniwa.

Example 3

Wet Milling Kaniwa to Extract Protein

A portion of kaniwa was wet milled. Optionally, sulfur dioxide was used during milling. After milling, the kaniwa was treated with lye solution, comprising water and sodium hydroxide. Next, the kaniwa was solvent oil extracted. Two solvents were tested for defatting kaniwa: diethyl ether and ethanol. Each solvent was equally efficient. Use of ethanol for extraction increased the protein yield when other salts were used. With sodium citrate, however, ethanol slightly decreased the protein yield. The extraction was performed on an about 1:10 w/v ratio at room temperature using a laboratory shaker for 2 to 6 hours.

The protein was precipitated from a solvent oil solution. The protein precipitation was measured by Leco Nitrogen analysis. The precipitated proteins were further concentrated by drying an analyzed as described above in Example 1. Lye, sulfites, and sodium bicarbonate were only used for the wet milling process. None of them was successful in increasing the yield of the protein extracted as compared to extraction methods known in the art.

While specific embodiments have been described above with reference to the disclosed embodiments and examples, such embodiments are only illustrative and do not limit the scope of the disclosure. Changes and modifications can be made in accordance with ordinary skill in the art without departing from the disclosure in its broader aspects as defined in the following claims.

What is claimed is:

1. A method for making a protein product from kaniwa, comprising:
   (a) milling the kaniwa;
   (b) contacting the milled kaniwa with a salt solution, wherein the salt is selected from the group consisting of ammonium chloride, potassium chloride, sodium chloride, calcium chloride, and sodium citrate;
   (c) adjusting the pH of the salt solution to a pH of 3 to 4.5 to effect precipitation of a protein from the kaniwa of step (b); and
   (d) drying the precipitated protein to form a protein product.

2. The method of claim 1, wherein the protein product is substantially free of bitter-tasting compounds.

3. The method of claim 2, wherein the bitter-tasting compound is a saponin.

4. The method of claim 1, wherein the milling step comprises at least one selected from the group consisting of dry milling and wet milling.

5. The method of claim 1, wherein the salt is sodium citrate.

6. The method of claim 1, wherein the sodium citrate solution of 0.5 wt. % to 5 wt. % in water and is used in a 1:5 to 1:15 w/v ratio with the milled kaniwa.

7. The method of claim 1, wherein the contacting step occurs for 2 to 6 hours.

8. The method of claim 1, wherein the drying step occur at 50° C. to 60° C. for 14 to 18 hours.

9. The method of claim 8, wherein the moisture content of the dried protein product is less that 5 wt. %.

10. The method of claim 1, further comprising centrifugation.

11. The method of claim 1, further comprising contacting the kaniwa with a solution of lye before milling.

12. The method of claim 1, wherein the protein product contains a complete set of essential amino acids.

13. A protein product produced according to the method of claim 1.

14. A protein powder containing a protein product produced according to the method of claim 1.

15. A protein drink containing protein product produced according to the method of claim 1.

16. A protein pill containing a protein product produced according to the method of claim 1.

17. A protein bar containing a protein product produced according to the method of claim 1.

18. A meal replacement containing a protein product produced according to the method of claim 1.

19. A pediatric product containing a protein product produced according to the method of claim 1.

20. A sports nutrition product containing a protein product produced according to the method of claim 1.

21. A method for making a protein product from kaniwa, comprising:
   (a) contacting kaniwa for 2 to 6 hours with a salt solution of 0.5 wt. % to 5 wt. % in water and in a 1:5 to 1:15 w/v ratio with the kaniwa, wherein the salt is selected from the group consisting of ammonium chloride, potassium chloride, sodium chloride, calcium chloride, and sodium citrate; and
   (b) adjusting the pH of the salt solution to a pH of 3 to 4.5 to effect precipitation of the protein from the kaniwa of step (a).

22. The method of claim 21, wherein the protein product is substantially free of bitter-tasting compounds.

23. The method of claim 21, wherein the bitter-tasting compound is a saponin.

24. The method of claim 21, further comprising milling the kaniwa before step (a), wherein the milling step comprises at least one selected from the group consisting of dry milling and wet milling.

25. The method of claim 21, wherein the salt is sodium citrate.

26. The method of claim 21, further comprising drying the precipitated protein at 50° C. to 60° C. for 14 to 18 hours.

27. The method of claim 26, wherein the moisture content of the dried protein product is less that 5 wt. %.

28. The method of claim 21, further comprising centrifugation.

29. The method of claim 21, further comprising contacting the kaniwa with a solution of lye before milling.

30. The method of claim 21, wherein the protein product contains a complete set of essential amino acids.

31. A method for making a protein product from kaniwa, comprising:
   (a) dry milling the kaniwa;
   (b) contacting the milled kaniwa for 2 to 6 hours with a sodium citrate solution of 0.5 wt. % to 5 wt. % in water and in a 1:5 to 1:15 w/v ratio with the milled kaniwa;
   (c) adjusting the pH of the salt solution to a pH of 3 to 4.5 to effect precipitation of the protein from the kaniwa of step (b);
   (d) centrifuging the mixture of milled kaniwa and the salt solution of step (c) to separate the precipitated protein from the salt solution; and
   (e) drying the precipitated protein at 50° C. to 60° C. for 14 to 18 hours to form a protein product;
   wherein the protein product is substantially free of bitter-tasting compounds, has a complete set of essential amino acids, and has a moisture content less that 5 wt. %.

32. The method of claim 31, further comprising contacting the kaniwa with a solution of lye before milling.

* * * * *